/ Patented Oct. 30, 1951

2,573,555

UNITED STATES PATENT OFFICE 2,573,555

METHOD FOR MAKING METHINE DYESTUFFS

Harry Derek Edwards, Ilford, England, assignor to Ilford Limited, Ilford, England, a British company No Drawing. Application September 22, 1949, Serial No. 117,266. In Great Britain October 2, 1948

7 Claims. (Cl. 260—304)

This invention relates to methine dyestuffs and particularly to dyestuffs having a substituted methine chain.

In my co-pending application Serial No. 117,265, filed September 22, 1949, now Patent No. 2,534,112, there is described the production of intermediates of the general formula:

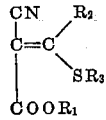

where $R_1$ and $R_2$ are alkyl groups and $R_3$ is an alkyl or aralkyl group. As explained in that application, $R_1$ and $R_2$ may be alkyl groups containing 1 to 12 carbon atoms, such as methyl, ethyl, hexyl, octyl and dodecyl groups, and $R_3$ may be any of such alkyl groups or an aralkyl group, e. g. benzyl or naphthylmethyl.

The preferred intermediates according to the said application have the formula:

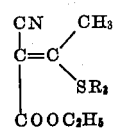

or

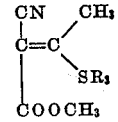

As explained in the said application, the compounds of the said formula may exist in the alternative stereoisomeric form represented by the formula:

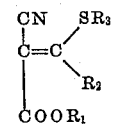

Accordingly the formula

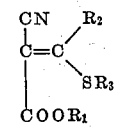

used herein and in the following claims is to be understood to include the stereoisomeric form represented by the said alternative formula.

Where in such intermediates the group $R_2$ is an alkyl or aralkyl group the formula may be rewritten:

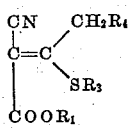

where $R_4$ is a hydrogen atom or an alkyl group. The $CH_2$ group in such compounds has been found to be reactive and according to the present invention dyestuffs are obtained by reacting a compound of the general formula:

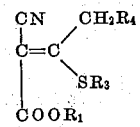

where $R_1$, $R_3$ and $R_4$ have the meanings assigned to them above, with an alkyl or aralkyl quaternary salt of a five-membered or six-membered heterocyclic nitrogen compound having a thioether group in $\alpha$ or $\gamma$ position to the quaternary nitrogen atom.

The course of the reaction is believed to be as follows:

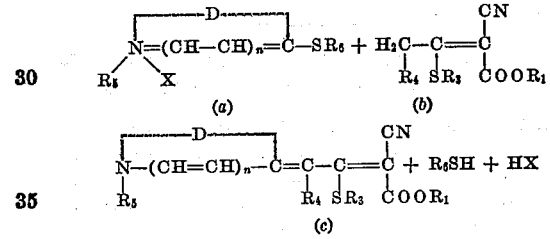

In the foregoing formulae $R_5$ represents an alkyl or aralkyl group and $R_6$ represents an alkyl group, e. g. any of those mentioned above, X represents an acid radicle, e. g. chloride, bromide, iodide, sulphate or p-toluene sulphonate, $n$ is nought or one, and D is the residue of a five-membered or six-membered heterocyclic nitrogen nucleus. The residue D may be, for example, the residue of any of the types of heterocyclic nuclei commonly employed in photographic sensitising dyes, e. g. thiazoles, oxazoles, selenazoles and their polycyclic homologues, such as those of the benzene, naphthalene, acenaphthene and anthracene series, pyridine and its polycyclic homologues such as quinoline and $\alpha$ and $\beta$ naphthoquinolines, lepidines, indolenines, diazines such as pyrimidines and quinazolines, diazoles such as thio-$\beta,\beta'$-diazole, oxazolines, thiazolines and selenazolines. The polycyclic compounds of these series may be substituted in the carbocyclic rings by one or more groups such as alkyl, aryl, amino, hydroxy, alkoxy and methylene-dioxy groups or by halogen atoms.

The reaction is preferably effected in the presence of a basic condensing agent, e. g. a basic organic agent such as pyridine or triethylamine.

In one form of the invention the heterocyclic nitrogen compound is converted to an alkyl or aralkyl quaternary salt and this simultaneously reacted with the thioether compound by fusing together the heterocyclic nitrogen compound, an alkyl or aralkyl salt and the thioether compound.

The dyes produced conform to formula (c) above and it will be noted that where $R_4$ is a hydrogen atom these have the same structure as, or a stereoisomeric structure with, the dyes produced according to the process of British Patent No. 610,569. As stated therein, such dyes are valuable sensitizers for photographic emulsions.

The following examples will serve to illustrate the invention, but are not to be regarded as limiting the invention in any way:

EXAMPLE 1

*Ethyl 4-(3-methyl-2:3-dihydrobenzthiazolylidene-2-) 3-ethylthio-2 cyano-2 butenoate*

Ethyl 2-cyano-3-ethylthio-2-butenoate (0.398 gm.; 0.002 mol.) was fused with methyl p-toluene sulphonate (0.398 gm.; .0025 mol.) and 2-methylthio-benzthiazole (0.362 gm.; .002 mol.) for 2¼ hours at 100° C. The mixture changed colour to dark orange and became more viscous.

Ethyl alcohol (5 cc.) was then added together with triethylamine (0.3 cc.; .002 mol.) and the whole boiled gently under reflux for 20 minutes. Cooling and dilution with a little water gave red crystals, m. pt. 116° C. These, on recrystallisation from ethyl alcohol, gave yellow/red needles, m. pt. 124° C. and further recrystallisation from ethyl alcohol raised the m. pt. to 128°.

This dyestuff, incorporated in a gelatino silver iodobromide emulsion, imparts a band of sensitivity extending to about 550 m$\mu$ with a strong peak maximum at 530 m$\mu$.

EXAMPLE 2

*Ethyl 4 - (3 - methyl-2:3-dihydrobenzthiazolylidene-2-)-3-methylthio-2-cyano-2-butenoate*

Ethyl 2-cyano-3-methylthio-2-butenoate (.925 gm.; .005 mol.) was fused with methyl para toluene sulphonate (.93 gm.; .005 mol.) and 2-methylthio-benzthiazole (.905 gm.; .005 mol.) for 16 hours at 100° C.

Ethyl alcohol (10 cc.) and triethylamine (.75 cc.; .005 mol.) were then added and the whole boiled gently under reflux for 10 minutes. Cooling and dilution gave orange crystals. M. pt. 157° C. Crystallisation from methyl alcohol gave m. pt. 164° C. Recrystallisation from methyl alcohol gave m. pt. 166° C.

This dyestuff, incorporated in a gelatino silver iodobromide emulsion, imparts a band of sensitivity extending to 540 m$\mu$ with a peak maximum at 525 m$\mu$.

EXAMPLE 3

*Ethyl 4-[3-ethyl-2:3-dihydro-benzthiazolylidene-2-]3-methylthio-2-cyano-2-butenoate*

Ethyl 2-cyano-3-methylthio-2-butenoate (.925 gm.; .005 mol.) was fused with methyl mercapto benzthiazole (.905 gm.; .005 mol.) and ethyl para toluene sulphonate (.995 gm.; .005 mol.) for 6 hours at 140° C.

The mixture was dissolved in ethyl alcohol (15 cc.) and boiled gently under reflux with triethylamine (.75 cc.; .005 mol.) for 10 minutes. On cooling and dilution orange/red crystals separated. M. pt. 145° C. Crystallisation from methyl alcohol gave m. pt. 146° C. Recrystallisation from methyl alcohol gave no increase in melting point.

EXAMPLE 4

*Ethyl 4-(3-methyl-2:3-dihydro-4:5-benz-benzthiazolylidene - 2 - ) -3-methylthio-2-cyano-2-butenoate*

2 methyl mercapto $\beta$ naphthathiazole (1.165 gms.; .005 mol.) was fused with methyl para toluene sulphonate (.93 gm.; .005 mol.) for 8 hours at 120° C. Ethyl-2-cyano-3-methylthio-2-butenoate (.925 gm.; .005 mol.) was added and the mixture boiled gently under reflux for 10 minutes in ethyl alcohol (20 cc.) with triethylamine (.75 cc.; .005 mol.). On cooling and dilution orange/red crystals separated. M. pt. 207° C. Crystallisation from methyl alcohol gave m. pt. 212° C. Rrecrystallisation from methyl alcohol gave m. pt. 213° C.

EXAMPLE 5

*Ethyl 4-(3-methyl-2:3-dihydro-5:6-dioxymethylene benzthiazolylidene - 2 - ) - 3-ethylthio-2-cyano-2-butenoate*

2 methyl mercapto dioxymethylene benzthiazole (.223 gm.; .001 mol.) was fused with methyl para toluene sulphonate (.186 gm.; .001 mol.) for 8 hours at 140° C. Ethyl-2-cyano-3-ethylthio-2-butenoate (.2 gm.; .001 mol.) was added and the mixture boiled gently under reflux for 10 minutes in ethyl alcohol (10 cc.) with triethylamine (.3 cc.; .001 mol.). On cooling and dilution orange/red crystals separated. M. pt. 216° C. (No second crop was obtained on further dilution.) Crystallisation from ethyl alcohol gave m. pt. 258° C. Recrystallisation from ethyl alcohol gave m. pt. 260° C.

EXAMPLE 6

*Ethyl 4 - (3-methyl-2:3-dhydro-4:5-benz-benzthiazolylidene - 2 - ) - 3-ethylthio-2-cyano-2-butenoate*

2 methyl mercapto $\beta$ naphthathiazole (.446 gm.; .002 mol.) was fused with methyl para toluene sulphonate (.372 gm.; .002 mol.) for 8 hours at 120° C. Ethyl-2-cyano-3-ethylthio-2-butenoate (.4 gm.; .002 mol.) was added and the mixture boiled gently under reflux for 10 minutes in ethyl alcohol (10 cc.) with triethylamine (.3 cc.; .002 mol.). On cooling and dilution orange/red crystals separated. M. pt. 221° C. (No second crop was obtained on further dilution.) Crystallisation from ethyl alcohol gave m. pt. 222° C. Further crystallisation did not raise the melting point.

EXAMPLE 7

*Ethyl 4-(3-methyl-2:3-dihydro-5:6-dioxymethylene benzthiazolylidene - 2-)-3-methylthio-2-cyano-butenoate*

2-methyl mercapto dioxymethylene benzthiazole (.066 gm.; .0003 mol.) was fused with methyl para toluene suphonate (.0558 gm.; .0003 mol.) for 8 hours at 140° C. Ethyl-2-cyano-3-methyl-thio-2-butenoate (.062 gm.; .0003 mol.) was added and the mixture boiled gently under reflux for 10 minutes in ethyl alcohol (5 cc.) with triethylamine (.05 cc.; .0003 mol.). On cooling and dilution orange/red crystals separated. M. pt. 249° C. (No second crop was obtained on further dilution.) Crystallisation from methyl alcohol gave m. pt. 252° C. Recrystallisation from methyl alcohol gave m. pt. 253° C.

EXAMPLE 8

*Ethyl 4 - (3-methyl-2:3-dihydrobenzthiazolylidene-2-)-3-isopropylthio-2-cyano-2-butenoate*

Methyl mercapto benzthiazole (.362 gm.; .002 mol.) was fused with methyl para toluene sulphonate (.364 gm.; .002 mol.) and ethyl-2-cyano-3-isopropylthio-2-butenoate (.426 gm.; .002 mol.) at 100° C. for 16 hours. Ethyl alcohol (10 cc.) and triethylamine (.3 cc.; .002 mol.) were then added and the mixture boiled gently under reflux for 10 minutes giving a yellow solution. On cooling and dilution orange/yellow crystals separated. M. pt. 174° C. Crystallisation from methyl alcohol gave m. pt. 178° C. Recrystallisation from methyl alcohol game m. pt. 179° C.

EXAMPLE 9

*Ethyl-4-[3 - methyl - 2:3-dihydrobenzthiazolylidene-2-]-3-n butylthio-2-cyano-2-butenoate*

Methyl mercapto benzthiazole (.362 gm.; .002 mol.) was fused with methyl para toluene sulphonate (.364 gm.; .002 mol.) and ethyl-2-cyano-3-n-butylthio-2-butenoate (.454 gm.; .002 mol. at 100° C. for 16 hours. Ethyl alcohol (10 cc.) and triethylamine (.3 cc.; .002 mol.) were then added and the mixture boiled gently under reflux for 10 minutes giving a yellow solution. On cooling and dilution orange crystals separated. M. pt. 147° C. Crystallisation from methyl alcohol gave m. pt. 152° C. Recrystallisation from methyl alcohol gave m. pt. 153° C.

EXAMPLE 10

*Ethyl 4-[3 - methyl - 2:3-dihydrobenzthiazolylidene-2-]-3-benzylthio-2-cyano-2-butenoate*

Methyl mercapto benzthiazole (.362 gm.; .002 mol.) was fused with methyl para toluene sulphonate (.364 gm.; .002 mol.) and ethyl-2-cyano-3-benzylthio-2-butenoate (.524 gm.; .002 mol.) at 100° C. for 16 hours. Ethyl alcohol (10 cc.) and triethylamine (.3 cc.; .002 mol.) were added and the mixture boiled gently under reflux for 10 minutes giving an orange/yellow solution. On cooling and dilution orange crystals separated. M. pt. 180° C. Crystallisation from methyl alcohol gave m. pt. 154° C. Recrystallisation from methyl alcohol gave m. pt. 155° C.

EXAMPLE 11

*Methyl 4 - (3-methyl-2:3-dihydrobenzthiazolylidene-2-)-3-ethylthio-2-cyano-2-butenoate*

Methyl mercapto benzthiazole (.724 gm.; .004 mol.) was fused with methyl para toluene sulphonate (.728 gm.; .004 mol.) at 100° C. for 12 hours. Ethyl alcohol (20 cc.), triethylamine (.6 cc.; .004 mol.) and methyl-2-cyano-3-ethylthio-2-butenoate (.78 gm.; .004 mol.) were added and the mixture boiled gently under reflux for 10 minutes giving a yellow solution. On cooling and dilution orange/red crystals separated. M. pt. 163° C. Crystallisation from methyl alcohol gave m. pt. 166° C. Recrystallisation from methyl alcohol gave m. pt. 167° C.

EXAMPLE 12

*Methyl 4 - (3-methyl-2:3-dihydrobenzthiazolylidene-2-)-methylthio-2-cyano-2-butenoate*

Methyl mercapto benzthiazole (.724 gm.; .004 mol.) was fused with methyl para toluene sulphonate (.728 gm.; .004 mol.) at 100° C. for 12 hours. Ethyl alcohol (20 cc.), triethylamine (.6 cc.; .004 mol.) and methyl-2-cyano-3-methylthio-2-butenoate (.78 gm.; .004 mol.) were added and the mixture boiled gently under reflux for 10 minutes giving a yellow solution. On cooling and dilution orange/red crystals separated. M. pt. 207° C. Crystallisation from methyl alcohol gave m. pt. 212° C. Recrystallisation from methyl alcohol gave m. pt. 213° C.

Corresponding compounds may be prepared by strictly analogous processes from quaternary salts of 2-ethylthio and 2-methylthio derivatives of quinoline, selenazole, benzselenazole, oxazole, benzoxazole, thiazoline, selenazoline, oxazoline and 33 dimethyl indolenine. The quaternary salts in each case may be methyl, ethyl or higher alkyl or benzyl iodides, bromides, hydrogen sulphates or p-toluene sulphonates.

What I claim is:

1. Process for the production of methine dyestuffs which comprises reacting a compound of the general formula:

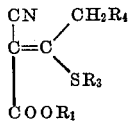

where $R_1$ is an alkyl group, $R_3$ is selected from the group consisting of alkyl and aralkyl groups and $R_4$ is selected from the class consisting of the hydrogen atom and alkyl groups, with a compound selected from the class consisting of alkyl and aralkyl quaternary salts of five-membered and six-membered heterocyclic nitrogen compounds of the type used in cyanine dyes, having a thioether group in one of the α and γ positions to the quaternary nitrogen atom.

2. Process for the production of methine dyestuffs which comprises reacting a compound of the general formula:

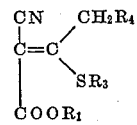

where $R_1$ is an alkyl group, $R_3$ is selected from the group consisting of alkyl and aralkyl groups and $R_4$ is selected from the class consisting of the hydrogen atom and alkyl groups, with a compound selected from the class consisting of alkyl and aralkyl quaternary salts of five-membered and six-membered heterocyclic nitrogen compounds of the type used in cyanine dyes, having a thioether group in one of the α and γ positions to the quaternary nitrogen atom, the reaction being effected in the presence of an organic basic condensing agent.

3. A process for the production of the methine dyestuff ethyl 4-(3-methyl-2:3-dihydrobenzthiazolylidene-2-) 3-ethylthio-2 cyano-2 butenoate which comprises reacting ethyl 2-cyano-3-ethylthio-2-butenoate, methyl p-toluene sulphonate and 2-methylthio-benzthiazole.

4. A process for the production of the methine dyestuff ethyl 4-(3 - methyl - 2:3 - dihydro - 4:5-benz-benzthiazolylidene-2-) - 3 - methylthio-2-cyano-2-butenoate which comprises reacting 2- methyl mercapto β naphthathiazole, methyl para toluene sulphonate and ethyl-2-cyano-3-methylthio-2-butenoate.

5. A process for the production of the methine dyestuff ethyl 4-(3-methyl-2:3-dihydro-5:6-dioxymethylene benzthiazolylidene-2-) - 3 - ethylthio-2-cyano-2-butenoate which comprises reacting 2-methyl mercapto dioxymethylene benzthiazole, methyl para toluene sulphonate and ethyl-2-cyano-3-ethylthio-2-butenoate.

6. A process for the production of the methine dyestuff ethyl 4-(3 - methyl - 2:3 - dihydro-4:5-benz-benzthiazolylidene - 2-) - 3 - ethylthio - 2-cyano-2-butenoate which comprises reacting 2-methyl mercapto β naphthathiazole, methyl para toluene sulphonate and ethyl-2-cyano-3-ethylthio-2-butenoate.

7. A process for the production of the methine dyestuff ethyl 4-[3-methyl-2:3-dihydrobenzthiazolylidene-2-] - 3 - benzylthio - 2 - cyano-2-butenoate which comprises reacting methyl mercapto benzthiazole, methyl para toluene sulphonate and ethyl-2-cyano-3-benzylthio-2-butenoate.

HARRY DEREK EDWARDS.

REFERENCES CITED

The following references are of record in the file of this patent:

UNITED STATES PATENTS

| Number | Name | Date |
| --- | --- | --- |
| 2,177,401 | Brooker | Oct. 24, 1939 |
| 2,310,640 | Kendall | Feb. 9, 1943 |
| 2,319,547 | Kendall | May 18, 1943 |

FOREIGN PATENTS

| Number | Country | Date |
| --- | --- | --- |
| 610,569 | Great Britain | 1948 |